United States Patent [19]
Parikh

[11] Patent Number: 5,319,784
[45] Date of Patent: Jun. 7, 1994

[54] SYSTEM FOR AUTOMATIC AND SELECTIVE COMPILE-TIME INSTALLATION OF FASTPATH INTO PROGRAM FOR CALCULATION OF FUNCTION/PROCEDURE WITHOUT EXECUTING THE FUNCTION/PROCEDURE

[75] Inventor: Shrikant N. Parikh, Mesquite, Tex.

[73] Assignee: International Business Machines Corp., Armonk, N.Y.

[21] Appl. No.: 810,594

[22] Filed: Dec. 18, 1991

[51] Int. Cl.⁵ .......................... G06F 9/44; G06F 9/45
[52] U.S. Cl. ............................... 395/700; 395/375; 395/725; 364/262.4; 364/280.4; 364/DIG. 1
[58] Field of Search ...................... 395/700, 375, 725; 364/DIG. 1, DIG. 2, ; 371/19

[56]        References Cited
              U.S. PATENT DOCUMENTS

| | | | |
|---|---|---|---|
| 4,598,364 | 7/1986 | Gum et al. | 371/19 |
| 4,656,583 | 4/1987 | Auslander et al. | 395/700 |
| 4,667,290 | 5/1987 | Goss et al. | 395/700 |
| 4,769,767 | 9/1988 | Hilbrink | 395/375 |
| 4,802,091 | 1/1989 | Cocke et al. | 395/700 |
| 4,843,545 | 6/1989 | Kikuchi | 395/700 |
| 4,862,351 | 8/1989 | Green et al. | 395/375 |
| 4,912,635 | 3/1990 | Nishimukai | 395/375 |
| 5,179,702 | 1/1993 | Spix et al. | 395/650 |
| 5,193,190 | 3/1993 | Janczyn et al. | 395/700 |
| 5,204,960 | 4/1993 | Smith et al. | 395/700 |

*Primary Examiner*—Thomas C. Lee
*Assistant Examiner*—Paul Harrity
*Attorney, Agent, or Firm*—A. Bruce Clay; Jonathan E. Jobe

[57]          ABSTRACT

A system is provided for enhancing a compiler with the capability to install a fastpath within a compiled program. The enhanced compiler allows a program to use the benefits of a fastpath without requiring the addition of new code to the source code. Any type of program, including multi-media, can benefit from the enhanced compiler. A program need only be evaluated to see if there are functions/procedures which can utilize a fastpath. A programmer may turn the enhancement on or off depending upon whether or not there are recurring calculations with results that do not change over time from the same input.

2 Claims, 3 Drawing Sheets

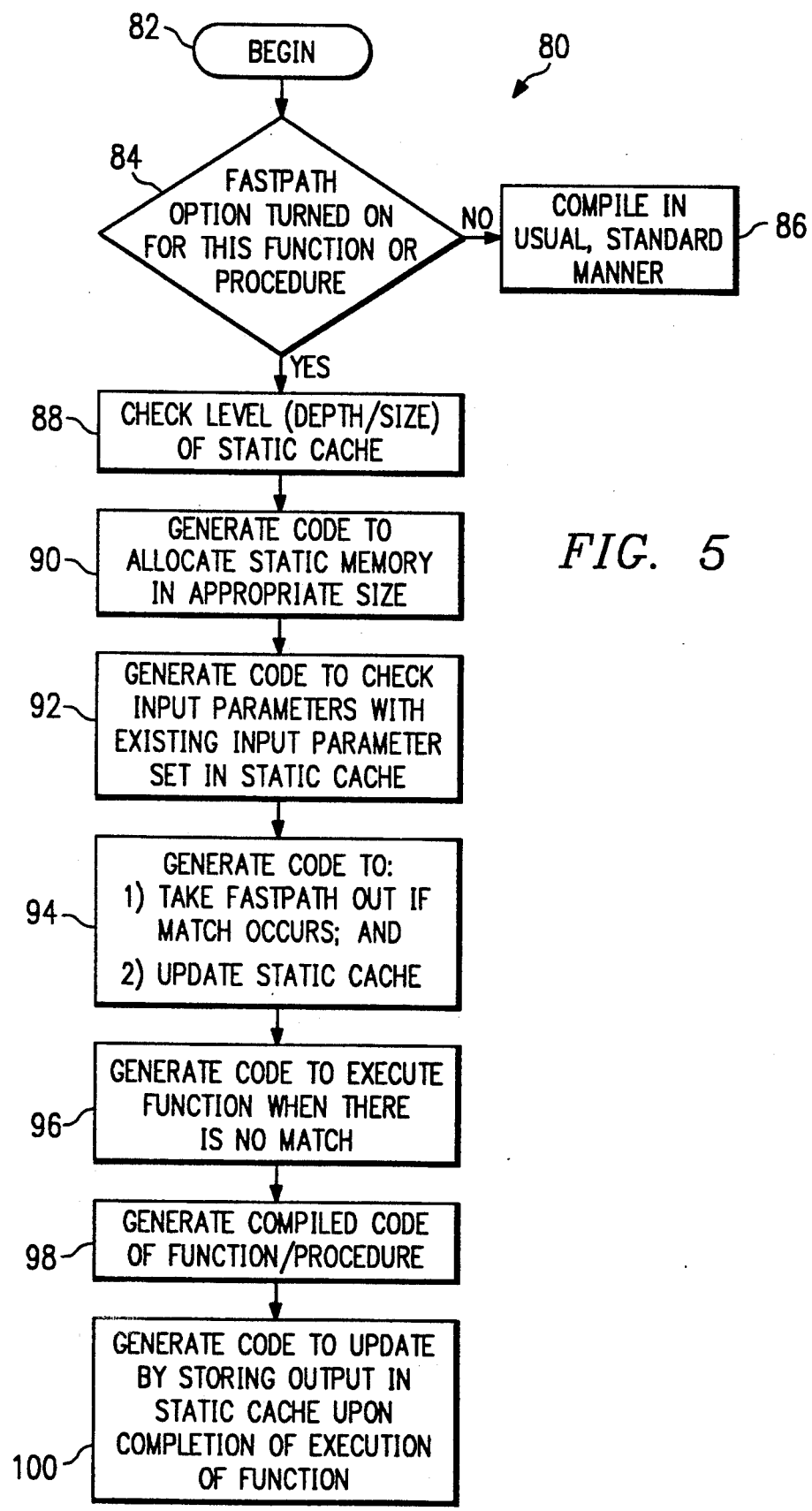

SYSTEM FOR AUTOMATIC AND SELECTIVE COMPILE-TIME INSTALLATION OF FASTPATH INTO PROGRAM FOR CALCULATION OF FUNCTION/PROCEDURE WITHOUT EXECUTING THE FUNCTION/PROCEDURE

TECHNICAL FIELD OF THE INVENTION

This invention relates in general to computer software, and in particular to a method of enhancing a compiler by the addition of a capability to add a fastpath to a program compiled thereby.

BACKGROUND OF THE INVENTION

As is well known in the art, a stream of computation may be repeatedly performed in software packages. Thus, it is often possible to insert "fastpaths" in the code to avoid repetitious computations. However, in most circumstances an intimate knowledge of the software package is required for the installation of the fastpath. The addition of a fastpath to a preexisting (or new) software package requires considerable work and testing. If a software package has been in existence for many years, the original designers may be unavailable and thus the loss of detailed knowledge of the software package which is required for the installation of a fastpath is also unavailable. In many cases, the required detailed knowledge may have been lost forever. Thus, even if an existing software package is identified for the utilization of fastpaths, significant amounts of additional work are required for the creation of the fastpaths. Thus there is a need for a method of providing fastpaths for software packages without requiring comparatively high amounts of additional work and detailed knowledge of the software package.

SUMMARY OF THE INVENTION

The present invention provides a method of integrating a fastpath in a software package which substantially reduces the amount of additional work and detailed knowledge of the software package required by the prior art. The present invention provides enhancement of a compiler which will then install the fastpath in a program compiled thereby.

In accordance with one aspect of the present invention, a method is provided for increasing the efficiency of a computer program in a data processing system which utilizes a compiler. The compiler is enhanced with a capability to install a fastpath in any program compiled thereby. A selectable range is provided in a cache for saving recurring input and corresponding output values which are recognized during execution of the compiled program. The enhancement may be selectively engaged or disengaged at the option of a programmer depending upon whether or not the program can benefit from a fastpath.

In accordance with another aspect of the present invention, a method is provided for reducing computation time in a computer system which utilizes a compiler. A fastpath is installed in a compiled program such that recurring input values are recognized. Output is then produced based upon previously conducted computations which utilized the recurring input values.

The present invention provides the technical advantage of allowing any software package that can utilize a fastpath to benefit from the fastpath. Detailed knowledge of the source code is no longer required, as a programmer need only determine if the package has functions/procedures which can utilize a fastpath.

BRIEF DESCRIPTION OF THE DRAWINGS

For a more complete understanding of the present invention and advantages thereof, reference is now made to the Detailed Description taken in conjunction with the attached Drawings, in which:

FIG. 5 illustrates a flow diagram of the present invention; and

DETAILED DESCRIPTION OF THE INVENTION

Figure 1:
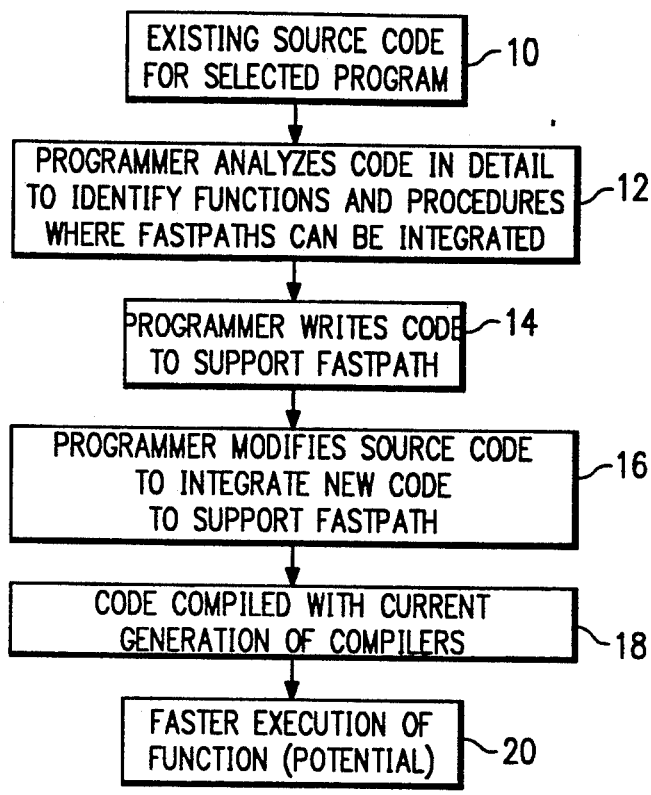
FIG. 1 is a schematic illustration of the use of fastpaths in accordance with the prior art.

Referring first to FIG. 1, a schematic illustration representing the actions required to install a fastpath in accordance with the prior art is shown. As indicated by block 10, source code already existed for a selected program in the prior art. If it were desired to install a fastpath within the existing source code, a programmer would be required to analyze the source code in detail to identify any functions and/or procedures where the fastpaths could be integrated into the program, as indicated at block 12. At block 14, the programmer would then be required to write code to support the fastpath for the function and/or procedure desired. At block 16, the programmer would modify the source code in the existing program to integrate the new code written at block 14 to support the fastpath.

The new source code, as modified, would then be compiled using one of the current generation of compiling programs. As a result of the insertion of the fastpath into the source code and the compiling thereof, (potentially) faster execution of the function and/or procedure would result. Thus the benefit of the fastpath within a specific program is that recurring computations do not require repetition. Therefore, when recurring input (which results in the same output) is used, the fastpath saves computation time.

Figure 2:
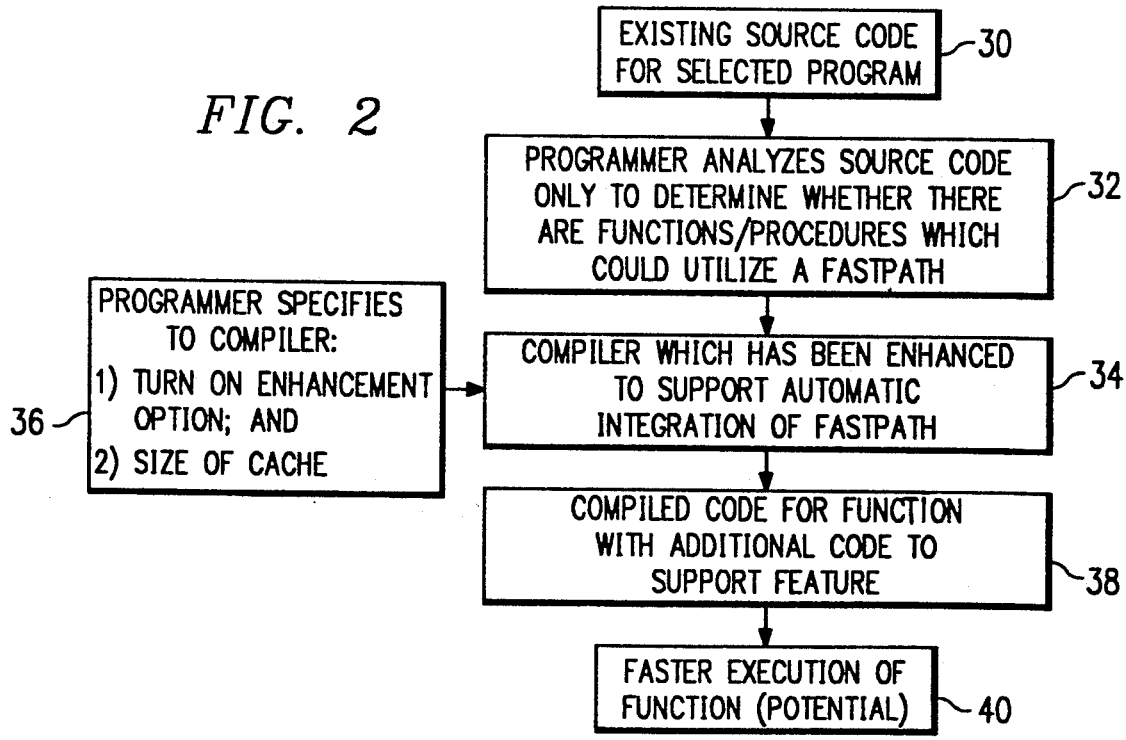
FIG. 2 is a schematic illustration of use of the present invention with a software package.

Referring next to FIG. 2, a schematic illustration of use of the method of the present invention is shown. As in the prior art, at block 30, source code for the selected program may already be in existence (if the source code is not already in existence, the present invention is still applicable). In contrast to the prior art, however, at block 32 the programmer analyzes the existing source code only to determine whether there are functions/procedures which could utilize a fastpath. Thus, as a result of the present invention, a detailed analysis of the source code requiring intimate knowledge thereof is no longer required.

At block 34, the source code is compiled by a compiler which has been enhanced to support the automatic integration of a fastpath in the selected program. Prior to the compiling of the selected program, the programmer specifies: 1) turn on the enhancement option; and 2) the size of the cache to be utilized. Thus the programmer selects the option of whether or not the enhancement installed in the compiler is to be utilized. The selection is based upon the analysis in block 32 previously described above. The size of the cache is determined by the programmer based upon other factors such as, for example, perception, test data, personal preference and etc.

As a result of the compiling with the fastpath enhanced compiler, compiled code for the function/procedure with additional code to support the fastpath feature results at block 38. Thus, (potentially) faster execution of the function/procedure occurs as a result of the compiler enhanced fastpath, as indicated at block 40.

In contrast to the prior art, the present invention, as schematically shown in FIG. 2, allows fastpath enhancement of programs already in existence without the need to have an indepth knowledge thereof. By enhancing the compiler, any program which may benefit from a fastpath may so benefit by simply turning on the enhancement feature. Therefore, any program already in existence that uses a compiler may benefit from fastpath techniques. Similarly, new programs being created, including multi-media concepts, may benefit from fastpath techniques without the need to insert separate code into the program thereof.

Figure 3:
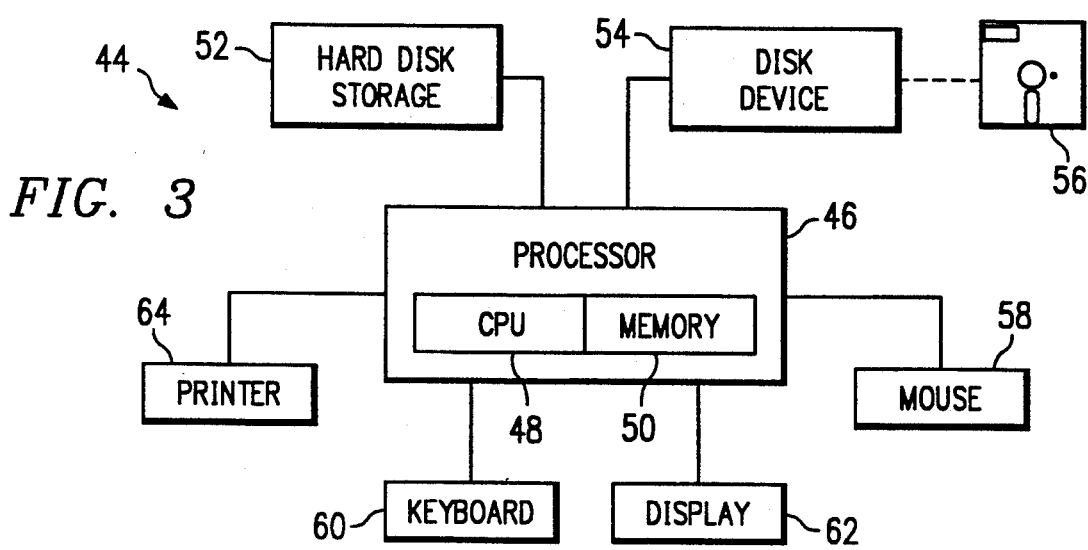
FIG. 3 is a schematic illustration of a data processing system in accordance with the present invention.

Referring now to FIG. 3, there is shown, in block diagram form, a data processing system 44 according to the present invention. The system 44 includes a processor 46, which includes a central processing unit (CPU) 48 and a memory 50. Additional storage, in the form of a hard disk storage 52 and a disk device 54, is connected to the processor 46. The disk device 54 receives a diskette 56 which has computer program code recorded thereon that implements the present invention in the system 44. The system 44 also includes user interface hardware, including a mouse 58 and a keyboard 60 for allowing user input to the processor 46 and a display 62 for presenting visual data to the user. The system 44 may also include a printer 64.

Figure 4:
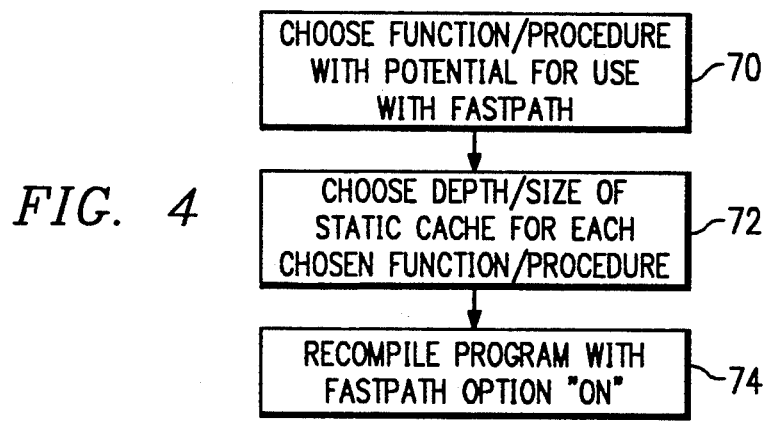
FIG. 4 is a flow diagram representing a programmers action in accordance with the present invention.

Referring to FIG. 4, there is shown in diagrammatic form the actions which a programmer takes to implement the present invention. At block 70, the programmer chooses the function/procedure with potential for use with a fastpath. The programmer then chooses the depth/size of a static cache for each chosen function/procedure at block 72 Finally, at block 74, the programmer recompiles the program with the fastpath option turned on.

Referring next to FIG. 5, the execution flow of the enhanced compiler (when the fastpath feature is turned on for a function/procedure) is generally identified by the reference numeral 80. The compiler begins at 82, and it is first determined at decision block 84 whether or not the fastpath option is turned on for this function or procedure. If the response to decision block 84 is no, the compiler proceeds to compile the program in the usual, standard manner at block 86. If the response to decision block 84 is yes, the level (depth/size) of the static cache is checked at block 88. At block 90, a code is generated to allocate static memory in the appropriate size. Code is then generated to check the input parameters with the existing input parameter set in the static cache at block 92. At block 94, code is generated to take the fastpath out if a match occurs. Also at block 94, code is generated which will update the cache during execution. At block 96, code is generated to execute the function/procedure when there is no match with the existing input parameters in the static cache. At block 98, the compiled code of the function/procedure is generated.

Finally, at block 100 code is generated to update the static cache with output values upon completion of execution of the function/procedure.

Various methods may be utilized at block 100 to update the cache. For example, the least recently used (LRU), frequency based, or other method such as programmer specified may be used. With the LRU method, depending upon the specified size of the static cache, the last input values are used. For example, if the static cache is sized to accept three input parameters, the last three that were used and their corresponding output will be stored therein. In the frequency based method, the most frequently used values will be kept.

Figure 6:
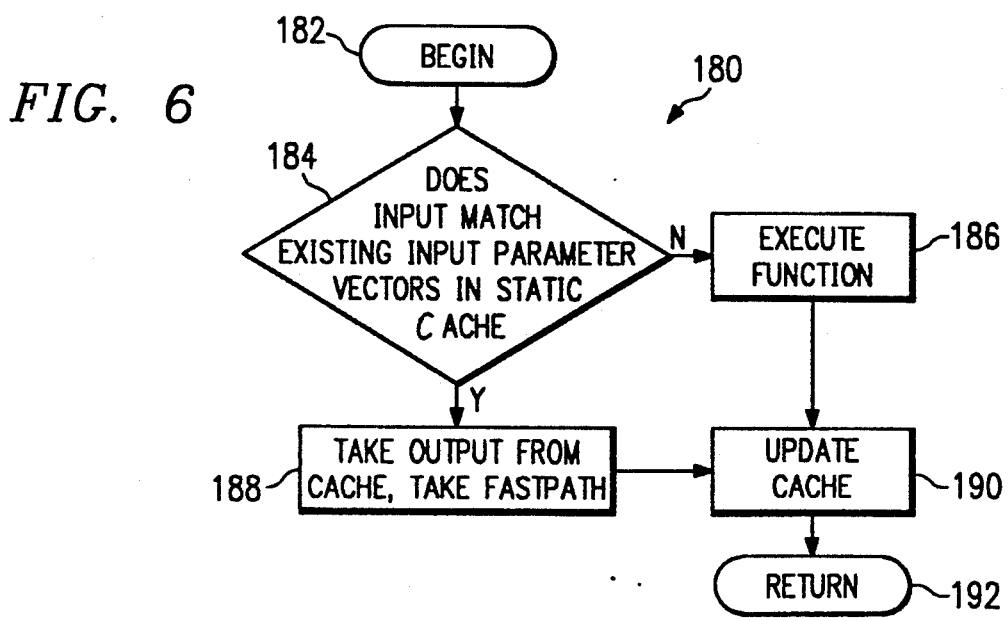
FIG. 6 is a flow chart of the program execution in accordance with the present invention.

Referring to FIG. 6, the program execution flow, i.e., how the function/procedure will execute with the fastpath option turned on, is generally identified by the reference numeral 180. After the program begins at 182, a decision block 184 is encountered. At decision block 184 it is determined whether or not the input matches the existing input parameter vectors in the static cache. If the response to decision block 184 is no, the program flow 180 proceeds to execute the function at block 186. If the response to decision block 184 is yes, output is taken from the cache and the fastpath is taken at block 188. Regardless of the response to decision block 184, after blocks 186 and/or 188, the cache is updated at block 190 followed by a return at block 192.

In summary, the present invention provides a method of utilizing a fastpath in a software package which substantially reduces the amount of additional work and detailed knowledge of the software package required by the prior art. The present invention provides enhancement of a compiler which will then install the fastpath in a program compiled thereby.

In accordance with one aspect of the present invention, a method is provided for increasing the efficiency of a computer program in a data processing system which utilizes a compiler. The compiler is enhanced with a capability to install a fastpath in any program compiled thereby. A selectable range is provided in a cache for saving recurring input values which are recognized during execution of the compiled program. The enhancement may be selectively engaged or disengaged at the programmer's option depending upon whether or not the program can benefit from a fastpath. If the program cannot benefit from the enhancement, and the programmer engages the enhancement, little if any harm will occur.

In accordance with another aspect of the present invention, a method is provided for reducing computation time in a computer system which utilizes a compiler. A fastpath is installed in a compiled program such that recurring input values are recognized. Output is then produced based upon previously conducted computations which utilized the recurring input values.

The present invention provides the technical advantage of allowing any software package that can utilize a fastpath to benefit from the fastpath Detailed knowledge of the source code is no longer required, as a programmer need only take an educated guess as to whether the package has functions/procedures which can utilize a fastpath.

Although the present invention has been particularly shown and described with reference to a preferred embodiment, it will be understood by those skilled in the art that various changes in form and detail may be made without departing from the spirit and the scope of the invention.

I claim:

1. A method of increasing efficiency of a computer program comprising at least one function/procedure in a data processing system which utilizes a compiler, comprising the steps of:

providing a selectable range in a cache for storing recurring input and corresponding output values;

inserting fastpath enabling code into source code of the compiler in order to selectively install a fastpath for the function/procedure in the computer program compiled thereby, said fastpath being accessed using said recurring input values in said cache and providing said corresponding output values for the function/procedure without executing the function/procedure;

selecting to install said fastpath;

compiling the program;

automatically installing said fastpath into the program during said step of compiling using said fastpath enabling code;

executing said compiled program; and executing said fastpath when said recurring input values are recognized during said execution of said compiled program to access said cache and to provide said corresponding output values for the function/procedure.

2. A computer system for increasing efficiency of a computer program comprising at least one function/procedure, comprising:

a compiler;

a cache having a selectable range for storing recurring input and corresponding output values;

means for inserting fastpath enabling code into source code of said compiler in order to selectively install a fastpath for the function/procedure in the computer program, said fastpath being accessed using said recurring input values in said cache and providing said corresponding output values for the function/procedure without executing the function/procedure;

means for electing to install said fastpath;

means for automatically installing said fastpath into the program using said fastpath enabling code when compiling the program with said compiler;

means for executing said compiled program; and means for executing said fastpath when said recurring input values are recognized during said execution of said compiled program to access said cache and to provide said corresponding output values for the function/procedure.

* * * * *